United States Patent
Jorgensen et al.

(10) Patent No.: US 7,141,766 B2
(45) Date of Patent: Nov. 28, 2006

(54) RESISTANCE HEATING SYSTEM

(75) Inventors: Glenn F. Jorgensen, Ridgewood, NJ (US); Michael W. Kelly, Joliet, IL (US); Laura Patterson, Joliet, IL (US)

(73) Assignees: JNT Technical Services, Inc., Little Ferry, NJ (US); Power House Tool, Joliet, IL (US)

( * ) Notice: Subject to any disclaimer, the term of this patent is extended or adjusted under 35 U.S.C. 154(b) by 0 days.

(21) Appl. No.: 11/074,507

(22) Filed: Mar. 8, 2005

(65) Prior Publication Data

US 2006/0201929 A1    Sep. 14, 2006

(51) Int. Cl.
*H05B 1/02*    (2006.01)
(52) U.S. Cl. .................... 219/497; 219/205; 219/492; 219/506; 219/483
(58) Field of Classification Search ............. 219/490, 219/494, 483–486, 202, 205, 497, 505, 492, 219/506, 533, 535
See application file for complete search history.

(56) References Cited

U.S. PATENT DOCUMENTS

| | | | |
|---|---|---|---|
| 2,176,601 A | 10/1939 | Bates | |
| 3,771,209 A | 11/1973 | Bennett, Jr. | |
| 4,454,084 A * | 6/1984 | Smith et al. | 264/40.1 |
| 4,847,468 A * | 7/1989 | Hufstetler | 219/203 |
| 5,196,673 A * | 3/1993 | Tanis | 219/205 |
| 5,397,876 A | 3/1995 | Shimamoto et al. | |
| 6,018,137 A * | 1/2000 | Reiff | 219/205 |
| 6,348,674 B1 * | 2/2002 | Russell | 219/243 |

FOREIGN PATENT DOCUMENTS

JP    361297039 A    * 12/1986

* cited by examiner

*Primary Examiner*—Mark Paschall
(74) *Attorney, Agent, or Firm*—Greer Burns & Crain

(57) ABSTRACT

A resistance heating system is provided which includes a resistance heater, a source of alternating current electricity connected by conductors to the resistance heater, and a controller comprising a timer arranged to connect the source of alternating current electricity to the resistance heater for a selected time period and to disconnect the source from the resistance following the selected time period. In an embodiment, the resistance heating system is provided with a controller configured to be connected to a source of alternating current electricity and having a plurality of cable plug receptacles arranged to receive electricity. An electricity conducting cable having a cable plug at one end is configured to be received in the receptacles and has a resistance heater provided at an opposite end. A master timer may be connected with a communication arrangement to the controller. The master timer is arranged to control an electric output of a plurality of the receptacles.

26 Claims, 6 Drawing Sheets

RESISTANCE HEATING SYSTEM

BACKGROUND OF THE INVENTION

The present invention relates to heating devices and controllers therefore, and in particular to a resistance heating device and its controller for heating a rod or post, such as a stud or threaded bolt.

The present invention has a particular application in the heating of studs or bolts, such as the bolts of a steam turbine casing. Although the invention is not limited to such an application, the invention will be described in such an environment and use.

It is desirable to heat the bolts used in a steam turbine casing during the fastening and unfastening thereof in that the bolt will elongate due to expansion during heating, allowing the nut to be threaded onto the bolt to a greater degree during the fastening process. When the bolt cools and shrinks, the nut is pulled tighter against the surrounding surface, thus assuring a secure fasting of the nut on the bolt and a clamping of the parts held together by the nut and bolt. In order to ease the removal of the nut from the bolt, such as during the servicing of the turbine, it is helpful to again heat the bolt to elongate it, in order to move the nut away from the surrounding surface, or at least to lessen the force holding the nut against that surface.

It has long been known to heat bolts, for example see U.S. Pat. No. 2,176,601, and to use induction heating to heat such bolts, for example, see U.S. Pat. Nos. 3,771,209 and 5,397,876.

Commonly available resistance type bolt heaters operate at 240 volts, and are individually controlled (on-off). These bolt heaters generally provide a heating power of about 50 watts per square inch. With the bolt heaters powered and controlled individually and with the given heating power output, the heating of a bolt used in a typical turbine requires generally 5 to 10 minutes or more of heating to elongate the bolt sufficiently to provide the necessary tightening or loosening of the bolt.

It would be an advance in the art if there were provided an easy to use resistance heating device and a method for heating multiple items, such as bolts.

SUMMARY OF THE INVENTION

The present invention provides a resistance heating system which can be utilized in a wide variety of environments, however, one environment of express utility is for use with bolt heaters in power plants.

The resistance heating system includes a resistance heater, a source of alternating current electricity connected by conductors to the resistance heater, and a controller comprising a timer arranged to connect the source of alternating current electricity to the resistance heater for a selected time period and to disconnect the source from the resistance following the selected time period.

In an embodiment, the timer includes an input arrangement for a user to input a selected time into the timer.

In an embodiment, the resistance heater comprises a bolt heater.

In an embodiment, the bolt heater includes a visual indicator to indicate when electrical current is being supplied to the bolt heater.

In an embodiment, an adapter sheath is arranged to effectively increase a diameter of the bolt heater.

In an embodiment, the source of alternating current electricity provides 480 volt electricity.

In an embodiment, the controller comprises a plurality of timers for controlling electricity flow to a plurality of resistance heaters simultaneously.

In an embodiment, the controller includes a visual indicator for displaying a status of the timer.

In an embodiment, the controller is mounted on a portable frame.

In an embodiment, the resistance heater is connected to the controller via a cable and a plug/receptacle interface.

In an embodiment, a resistance heating system is provided which comprises a controller configured to be connected to a source of alternating current electricity and having a plurality of cable plug receptacles arranged to receive electricity. An electricity conducting cable having a cable plug at one end is configured to be received in the receptacles and has a resistance heater provided at an opposite end. A master timer may be connected with a communication arrangement to the controller. The master timer is arranged to control an electric output of a plurality of the receptacles.

In an embodiment, the receptacles may each be controlled by a separate timer.

In an embodiment, a single master switch controls electricity flow to each of the receptacles.

In an embodiment, the controller includes a user operable selection switch to enable the timer controller on the cable to control the electric output of the at least one other of the receptacles.

In an embodiment, a resistance heating system is provided which comprises a controller configured to be connected to a source of alternating current electricity and having a plurality of cable plug receptacles. An electricity conducting cable having a cable plug at one end is configured to be received in the receptacles and has a resistance heater provided at an opposite end. A timer is associated with each receptacle. An input arrangement is provided for a user to input a selected time into said timers, and a visual indicator is arranged to display a status of each of the receptacles.

DETAILED DESCRIPTION OF THE PREFERRED EMBODIMENTS

The present invention, as illustrated in the FIGs., provides a resistance heating system 20 which can be utilized in a wide variety of environments. One particular environment of express utility is for use with bolt heaters used, for example, in power plants, however, the invention is not limited to such an embodiment, but rather the invention is described herein referencing such an embodiment.

Figure 1:
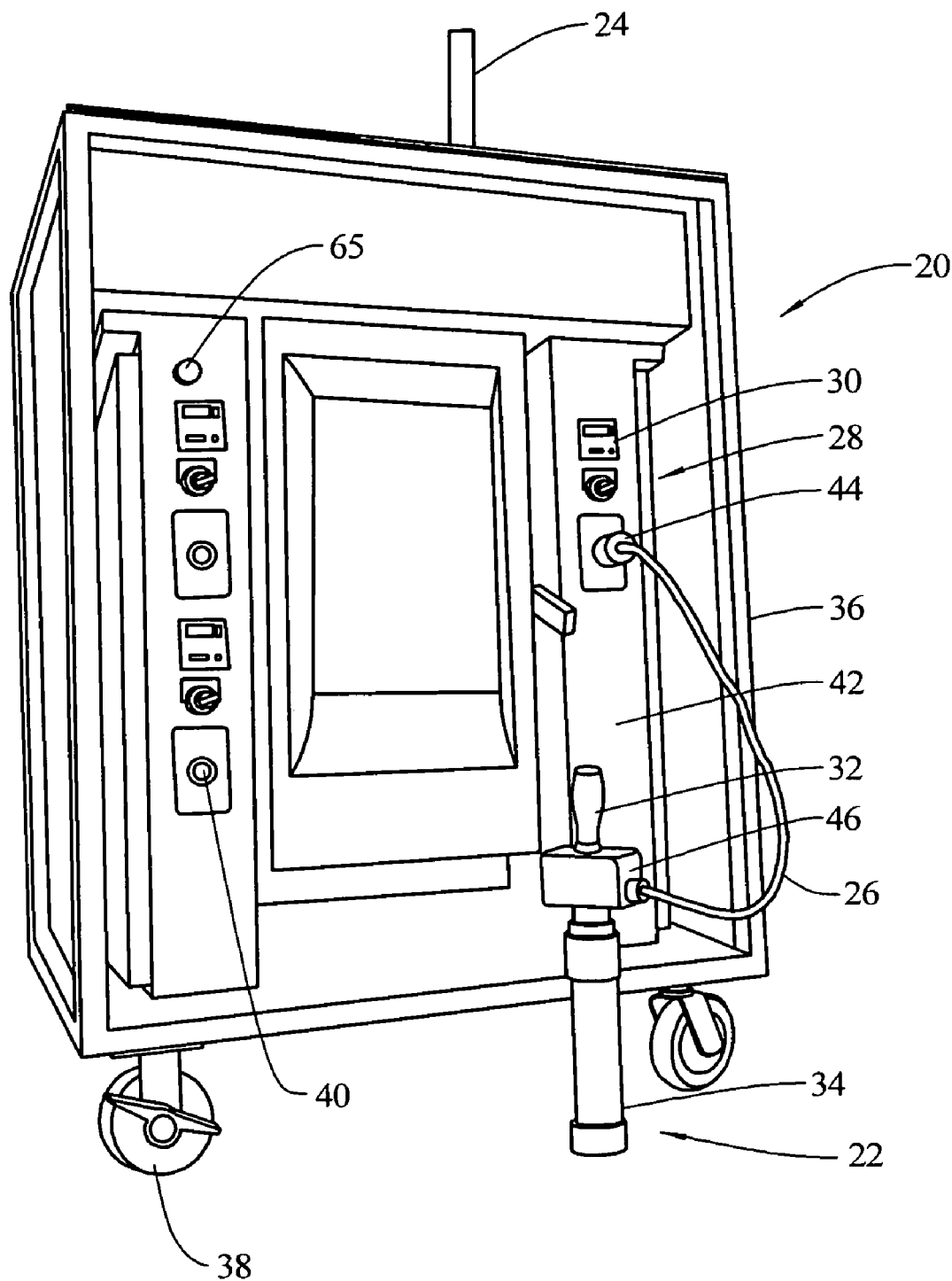
FIG. 1 is a side elevational view of a resistance heating system embodying the principles of the present invention.

As illustrated in FIG. 1, the resistance heating system 20 includes a resistance heater 22, a source of alternating current electricity 24 connected by conductors 26 to the resistance heater, and a controller 28 including a timer 30 arranged to connect the source of alternating current electricity to the resistance heater for a selected time period and to disconnect the source from the resistance following the selected time period.

Figure 7:
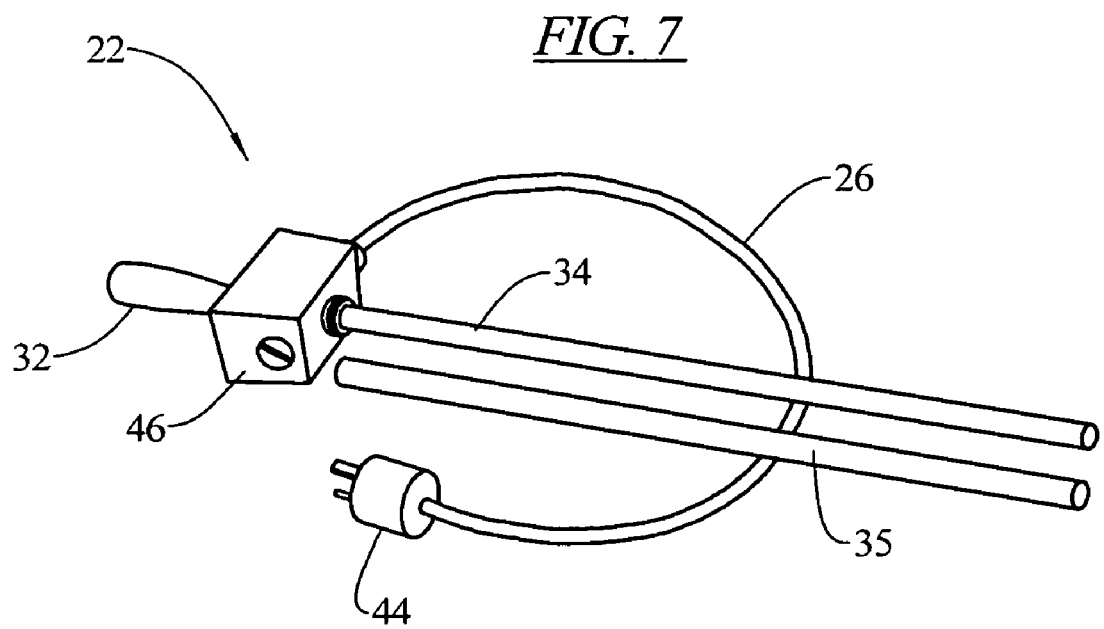
FIG. 7 is a side perspective view of a bolt heater resistance heating device and an adaptor sleeve.

The resistance heater 22 may be a bolt heater, such as illustrated in FIG. 1. In such an embodiment, the bolt heater 22 is provided with a handle 32 to allow for manual grasping of the bolt heater by a user, and includes a cylindrical metal portion 34 sized to be inserted into an axial hole or bore in a bolt or stud, to heat the bolt in the tightening or loosening operation, such as described in U.S. Pat. No. 5,994,682, the disclosure of which is incorporated herein by reference. One or more adaptor sheaths 35 (FIG. 7) may be provided to allow a single sized cylindrical metal portion 34 of the bolt heater 22 to be used for a variety of different sized bores in bolts or studs. The adaptor sheath 35 should have an internal diameter with a close tolerance with the outer diameter of the cylindrical metal portion of the bolt heater 22, and an external diameter with a close tolerance with the inner diameter of the bore of bolt or stud. Also, the adapter sheath 35 should be made of a thermal conducting material such as metal, for example, stainless steel, such that the heat generated by the bolt heater 35 would be transmitted through the sheath by conduction to the surrounding metal of the bolt or stud. Appropriate arrangements may be provided to permit the adaptor sheath 35 to be removed from the bore either in conjunction with or separately from the removal of the cylindrical metal portion 34 of the bolt heater 22.

The controller 28 is configured to be connected to a source of alternating current electricity, such as 480 volt three phase alternating current electricity. Other voltages of electricity, as well as single phase electricity, may be provided, however 480 volt three phase alternating current electricity is available at most industrial and power plant sites, and allows for a more rapid heating of the studs with the resistance heater 22.

The controller 28 may be mounted on a portable frame 36 carried on casters or wheels 38 to allow the controller to be moved closely to a location where the controller is to be utilized, such as in a power plant. The controller 28 is provided with internal components, including transformers, circuit breakers and wiring which are arranged to deliver electricity to a plurality of cable plug receptacles 40 provided on one or more panels 42 of the controller.

The conductors 26 are provided in the form of an electricity conducting cable having a cable plug 44 at one end which is configured to be received in the receptacles 40. For example, the cable plug 44 may be of the twist-lock type, to mate with a twist-lock receptacle 40 to provide a positive lock for the interface between the cable 26 and the controller 28. The cable 26 has the resistance heater 22 provided at the end opposite the cable plug 44.

Figure 8:
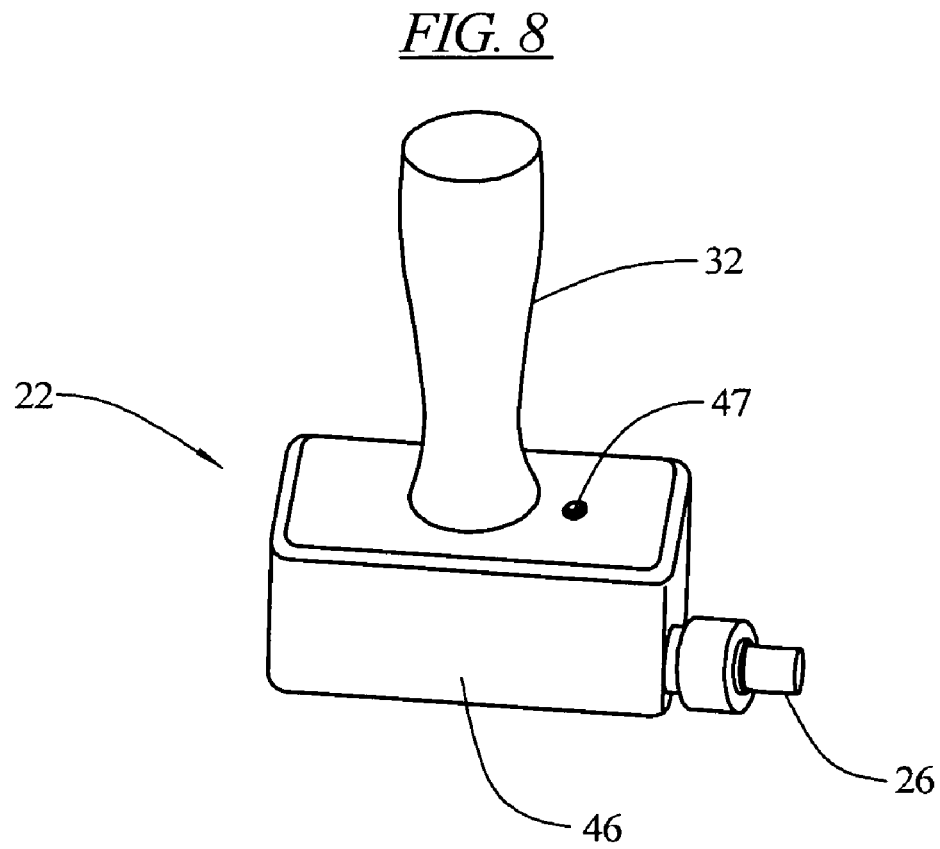
FIG. 8 is an enlarged partial view of the bolt heater junction box with the handle and visual indicator.

The resistance heater 22 may be provide with a connection or junction box 46 at which the conductors 26 can be connected to the resistance element of the resistance heater. The junction box 46 may be provided with a visual indicator 47 (FIG. 8) such as an LED powered by means of a current transformer, such as a ferrite donut shaped core, providing an induced current from one of the conductors 26 to energize the visual indicator. In this manner high voltage lamps or voltage transformers are not required for the visual indicator.

The visual indicator may be positioned directly adjacent to the handle 32 so as to alert a user that the resistance heater 22 is energized, in which case, it should not be removed from the bore or hole, in order to prevent an overheating, and potential damage to the resistance heater.

In operation, the cylindrical metal portion 34 of the bolt heater 22 is to be inserted into a preformed bore in a threaded stud portion of a bolt, with close tolerances between the metal portion and the bore. The bolt heater 22 is energized and the resistance heater increases the temperature of the stud, causing the stud to elongate. A threaded nut is then tightened onto the stud, and the bolt heater is deenergized and removed, allowing the stud to cool and shrink, longitudinally, thereby increasing the holding force of the nut on the stud. To remove the nut from the stud, the reverse process is employed.

Figure 2:
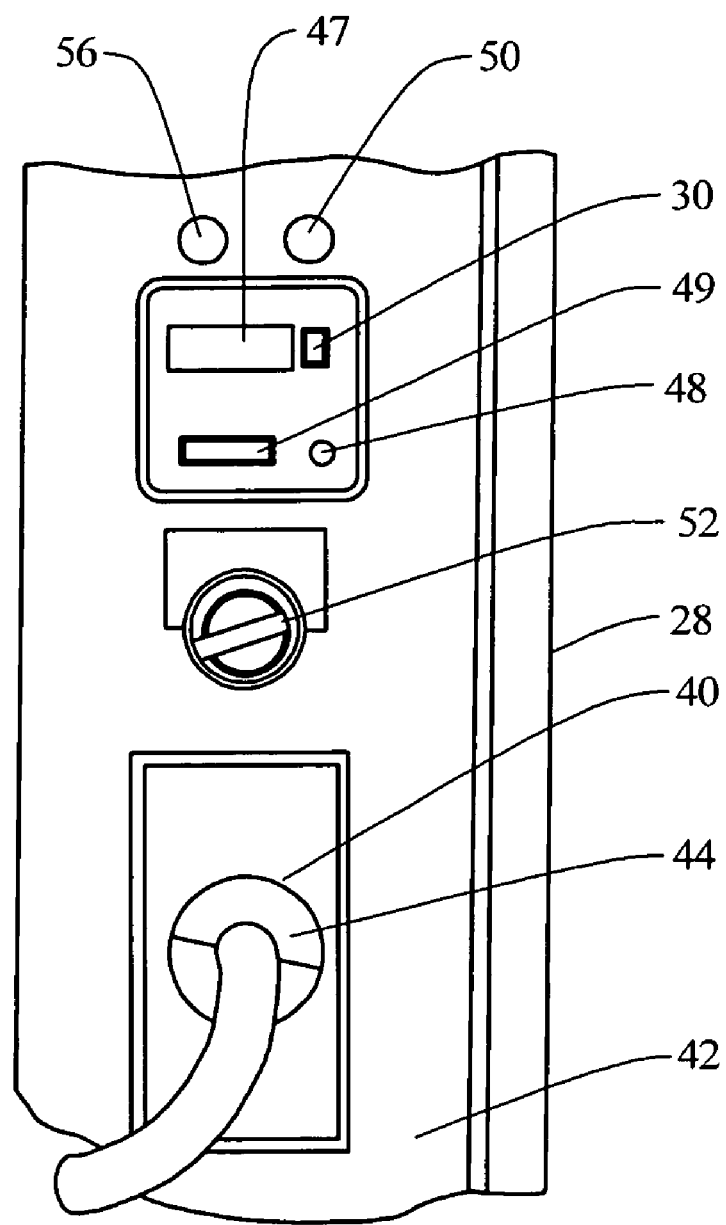
FIG. 2 is an enlarged partial view of a receptacle and timer area of the controller of FIG. 1.

In order to provide the necessary heating for the stud, the present invention utilizes the timer 30 to energize the resistance heater 22 for a predetermined time period. The timer 30 may include an input arrangement 48 (FIG. 2), such as a rotary switch, a toggle switch, a rocker switch, a keypad or number pad or other well known input devices for a user to input a selected time into the timer. The timer 30 may also include a display 47, such as an LCD or other type of display to indicate the status and amount of time remaining on the timer. Each timer 30 may also be provided with a start/stop switch 49 used to start or stop the countdown of the timer, and thus the provision of electricity to the receptacle 40 while the timer is counting down the remaining time.

Typically a separate timer 30 is provided for each receptacle 40, so that the electricity provided at each receptacle is provided by the separate and dedicated timer, and several receptacles may be provided with electricity simultaneously, if their timers are running concurrently. A visual indicator, such as an incandescent bulb or LED or other similar visual indicator 50 may be provided adjacent to each timer 30 or receptacle 40 for displaying a status of the timer or receptacle, such as that a particular receptacle is energized with electricity.

A selector switch 52 may be provided adjacent to each receptacle 40 with several modes of operation selectable by a user. One position 52a of the selector switch 52 may be "off" which will prevent any electricity from being supplied to the associated receptacle 40, despite the condition of the timer 30. Another position 52b of the selector switch 52 may be "hand" or "manual" in which case, the receptacle 40 would be supplied continuously with electricity, despite the condition of the timer 30. This mode would be useful in determining the length of time required to satisfactorily heat an object, such as a stud, with the resistance heater 22. Following this determination, the now known length of time could be input into the timers 30 to heat other similar objects to the required degree. Thus, another position 52c of the selector switch 52 may be "automatic" in which case the receptacle 40 would be supplied with electricity only so long as its controlling timer was supplied with a non-zero length of time.

A separate timing circuit may be utilized to measure a period of time following the termination of energization of the resistance heater 22 to allow for a cool down period for the resistance heater. A visual indicator 56 may be provided for the user to indicate when the resistance heater 22 may have sufficiently cooled so as to allow for safe removal and handling of the resistance heater following termination of energization of the heater. For example, a red light may illuminate during the period that a receptacle is energized, and for a period, such as a minute, following the deenergization of the receptacle. At that point, the red light may be extinguished and a green light may be illuminated.

Figure 3:
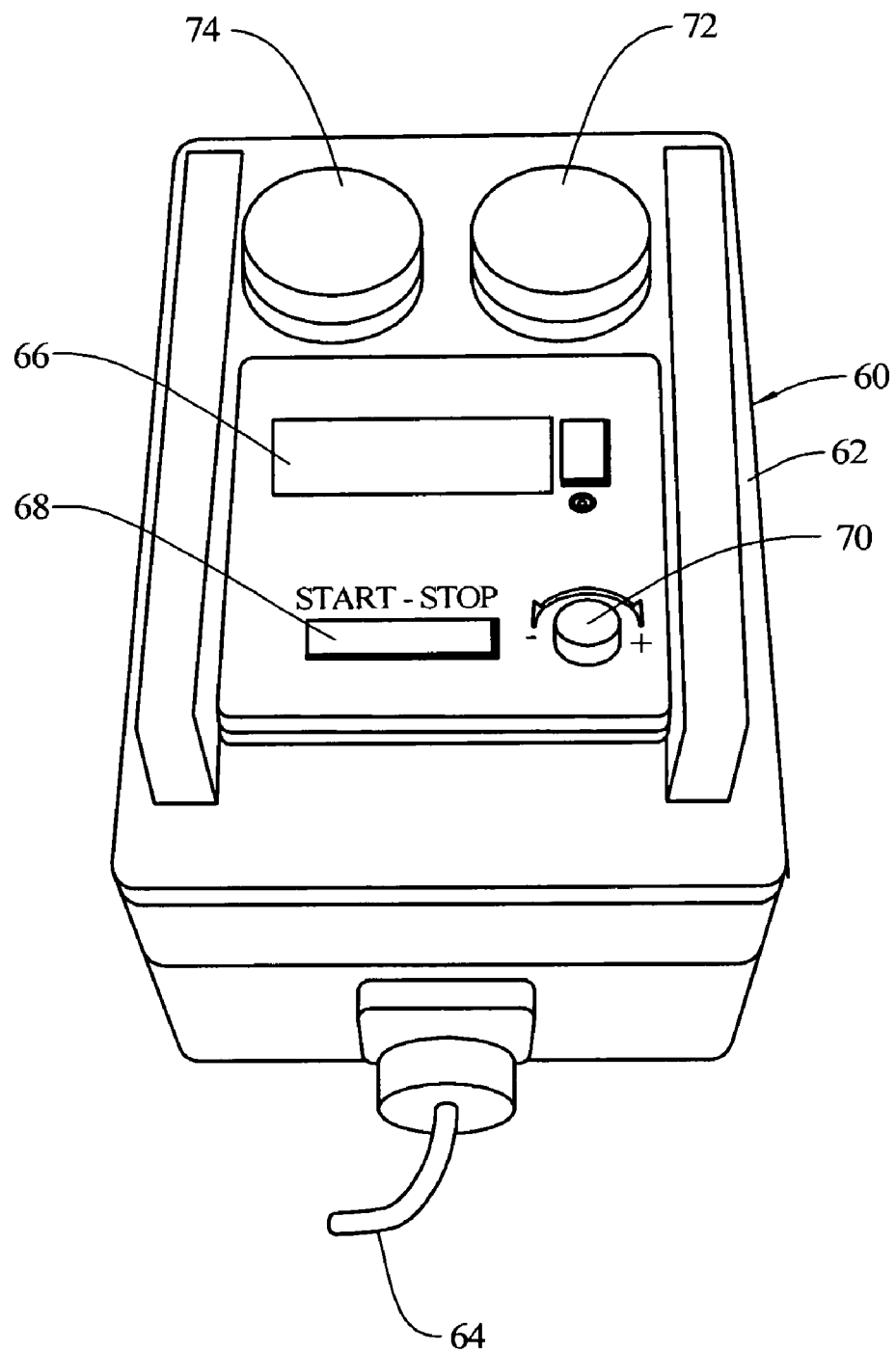
FIG. 3 is an enlarged end perspective view of a remote master timer for the resistance heating system of FIG. 1.
Figure 4:
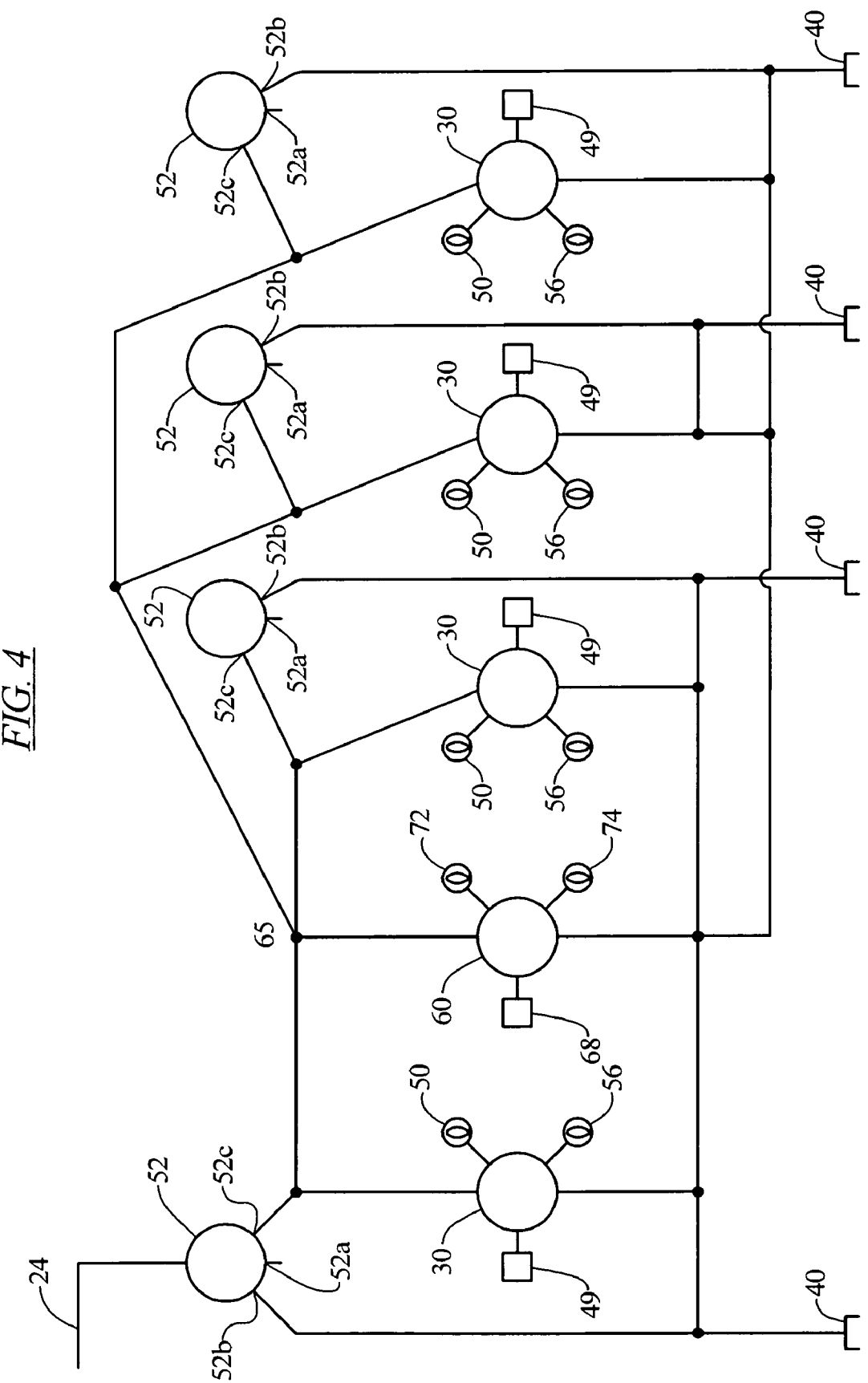
FIG. 4 is an electrical schematic of the resistance heating system embodying the principles of the present invention.

The present invention also allows for a master operation wherein a plurality of receptacles 40 may be controlled by a single timer in the form of a master timer 60 (FIG. 3). The master timer 60 may be mounted directly on the panel 42 of the controller 28 or may carried on a remote pendent 62. The provision of a remote pendent 62 will allow a user to control the heating operation while at a position close to the resistance heater 22, rather than being at the controller 28. The remote pendent 62 may be connected by a communication path, such as a cable 64 and a receptacle 65 or a wireless communication arrangement, to the controller 28 as shown in the electrical schematic of FIG. 4. The master timer 60 may be used to provide an alternate path for electricity from the source of current to the various receptacles 40, when the selector switches 52 are positioned in the automatic mode position. The remote pendent 62 may be provided with the master timer 60, as well as a display 66 for the master timer, a start/stop switch 68 for the master timer, an input arrangement 70 for the master timer, and indicator lights 72, 74, all as described above with respect to similar components provided in association with each of the receptacle dedicated timers 30.

By using the master timer 60, the user may simultaneously control a plurality of the receptacles 40, and thus energize a plurality of the resistance heaters 22 simultaneously, thereby reducing the length of time required to heat a plurality of studs, for example. In a power plant environment, this time savings will help to greatly reduce the length of time a particular electricity generating device may be out of service for repair or maintenance.

In the illustrated embodiment, an electricity conducting cable 64 having a cable plug at one end is configured to be received in the receptacle 65 at the controller 28 and has the master timer 60 located at an opposite end of the cable. The master timer 60, when connected, controls an electric output of a plurality of receptacles 40, so long as their associated selector switches 52, if they are provided with such switches, are positioned in the automatic position 52c.

Figure 5:
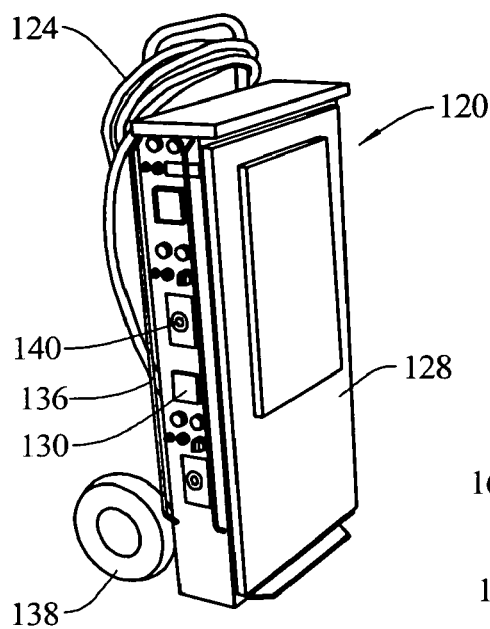
FIG. 5 is a side perspective view of an alternative embodiment of a resistance heating system embodying the principles of the present invention.
Figure 6:
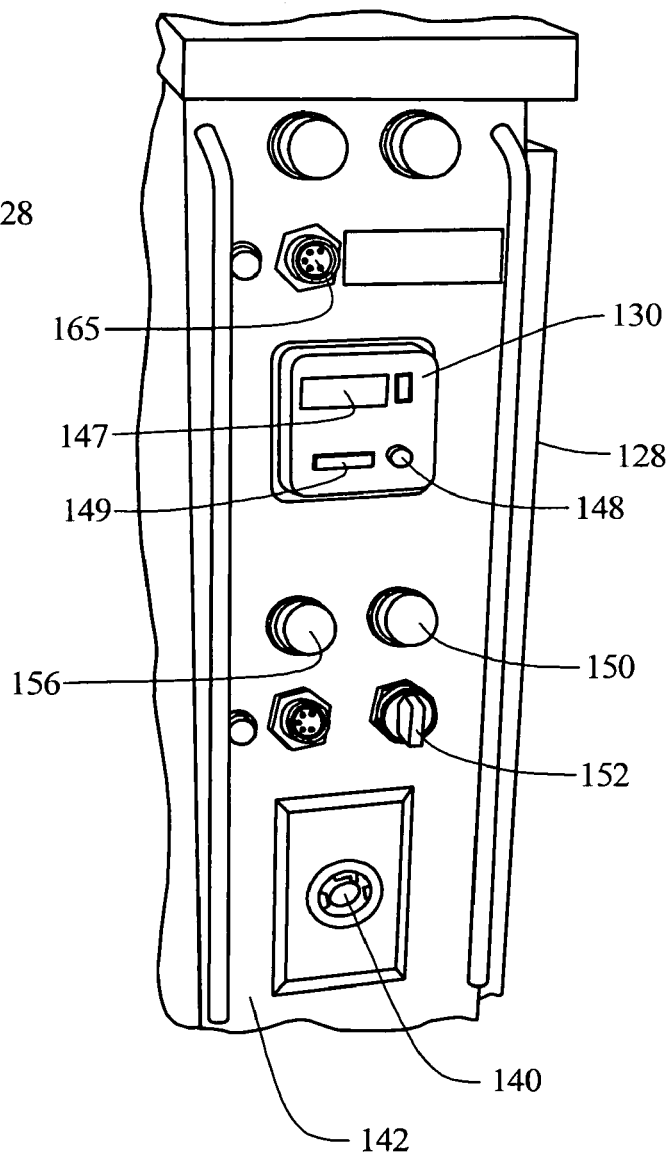
FIG. 6 is an enlarged partial view of a receptacle and timer area of the controller of FIG. 5.

FIGS. 5 and 6 illustrate an alternative embodiment of the present invention. In these FIGs., there is illustrated a resistance heating system 120 comprising a source of alternating current electricity 124 which may be connected by conductors 26 to the resistance heater 22 as illustrated in FIG. 1. A controller 128 comprising a 130 timer is arranged to connect the source of alternating current electricity 124 to the resistance heater 22 for a selected time period and to disconnect the source from the resistance following the selected time period. The controller 128 is configured to be connected to a source of alternating current electricity, such as 480 volt three phase alternating current electricity.

The controller 128 may be mounted on a portable frame 136 carried on casters or wheels 138 to allow the controller to be moved closely to a location where the controller is to be utilized, such as in a power plant. In this embodiment, the portable frame 136 is in the form of a hand truck or dolly with two wheels 138. The controller 128 is provided with internal components, including transformers, circuit breakers and wiring which are arranged to deliver electricity to a plurality of cable plug receptacles 140 provided on one or more panels 142 of the controller.

In order to provide the necessary heating for the stud, this embodiment utilizes the timer 130 to energize the resistance heater 22 for a predetermined time period. The timer 130 may include an input arrangement 148 (FIG. 6), such as a rotary switch, a toggle switch, a rocker switch, a keypad or number pad or other well known input devices for a user to input a selected time into the timer. The timer 130 may also include a display 147, such as an LCD or other type of display to indicate the status and amount of time remaining on the timer. Each timer 130 may also be provided with a start/stop switch 149 used to start or stop the countdown of the timer, and thus the provision of electricity to the receptacle 140 while the timer is counting down the remaining time.

Typically a separate timer 130 is provided for each receptacle 140, so that the electricity provided at each receptacle is provided by the separate and dedicated timer, and several receptacles may be provided with electricity simultaneously, if their timers are running concurrently. A visual indicator, such as an incandescent bulb or LED or other similar visual indicator 150 may be provided adjacent to each timer 130 or receptacle 140 for displaying a status of the timer or receptacle, such as that a particular receptacle is energized with electricity.

A selector switch 152 may be provided adjacent to each receptacle 140 with several modes of operation selectable by a user. One position of the selector switch 152 may be "off" which will prevent any electricity from being supplied to the associated receptacle 140, despite the condition of the timer 130. Another position of the selector switch 152 may be "hand" or "manual" in which case, the receptacle 140 would be supplied continuously with electricity, despite the condition of the timer 130. This mode would be useful in determining the length of time required to satisfactorily heat an object, such as a stud, with the resistance heater 22. Following this determination, the now known length of time could be input into the timers 130 to heat other similar objects to the required degree. Thus, another position of the selector switch 152 may be "automatic" in which case the receptacle 140 would be supplied with electricity only so long as its controlling timer was supplied with a non-zero length of time.

A separate timing circuit may be utilized to measure a period of time following the termination of energization of the resistance heater 22 to allow for a cool down period for the resistance heater. A visual indicator 156 may be provided for the user to indicate when the resistance heater 22 may have sufficiently cooled so as to allow for safe removal and handling of the resistance heater following termination of energization of the heater. For example, a red light may illuminate during the period that a receptacle is energized, and for a period, such as a minute, following the deenergization of the receptacle. At that point, the red light may be extinguished and a green light may be illuminated.

The embodiment of FIGS. 5 and 6 also allows for a master operation wherein a plurality of receptacles 140 may be controlled by a single timer in the form of a master timer 60 (FIG. 3). The master timer 60 may be mounted directly on the panel 142 of the controller 128 or may carried on a remote pendent 62. The remote pendent 62 may be connected by a communication path, such as a cable 64 and a receptacle 165 or a wireless communication arrangement, to the controller 128. The master timer 60 may be used to provide an alternate path for electricity from the source of current to the various receptacles 140, when the selector switches 152 are positioned in the automatic mode position.

By using the master timer 60, the user may simultaneously control a plurality of the receptacles 140, and thus energize a plurality of the resistance heaters 22 simultaneously, thereby reducing the length of time required to heat a plurality of studs, for example. In a power plant environment, this time savings will help to greatly reduce the length of time a particular electricity generating device may be out of service for repair or maintenance.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A resistance heating system comprising:
    a controller configured to be connected to a source of alternating current electricity and having a plurality of cable plug receptacles arranged to receive electricity,
    a plurality of electricity conducting cables, each having a cable plug at one end configured to be received in one of said receptacles and having a resistance heater provided at an opposite end,
    an individual timer associated with each receptacle arranged to selectively provide such receptacle with electricity during a time interval,
    a master timer connected with a communication arrangement to said controller,
    said master timer arranged to selectively provide a plurality of said receptacles with electricity during a time interval, and
    a switch to permit a user to select a master timer or an individual timer control for each receptacle.

2. A resistance heating system according to claim 1, wherein said individual timers and said master timer include an input arrangement for a user to input a selected time into said timers.

3. A resistance heating system according to claim 1, wherein said resistance heater comprises a bolt heater.

4. A resistance heating system according to claim 3, wherein said bolt heater includes a visual indicator to indicate when electrical current is being supplied to said bolt heater.

5. A resistance heating system according to claim 3, further including an adapter sheath arranged to effectively increase a diameter of said bolt heater.

6. A resistance heating system according to claim 1, wherein said source of alternating current electricity provides 480 volt electricity.

7. A resistance heating system according to claim 1, wherein said controller includes a visual indicator for displaying a status of each of said timers.

8. A resistance heating system according to claim 1, wherein said controller is mounted on a portable frame.

9. A resistance heating system comprising:
    a controller configured to be connected to a source of alternating current electricity and having a plurality of cable plug receptacles arranged to receive electricity,
    a plurality of electricity conducting cables each having a cable plug at one end configured to be received in said receptacles and having a resistance heater provided at an opposite end,
    a master timer connected with a communication arrangement to said controller,
    said master timer arranged to control an electric output of a plurality of said receptacles, and
    an illumination display indicator associated with each receptacle to provide an indication of a status of each receptacle.

10. A resistance heating system according to claim 9, wherein said controller is mounted on a portable frame.

11. A resistance heating system according to claim 10, wherein said frame is provided with wheels.

12. A resistance heating system according to claim 9, wherein said master timer is provided remote from said controller.

13. A resistance heating system according to claim 9, wherein said master timer controls electricity flow to each of said receptacles.

14. A resistance heating system according to claim 9, wherein said controller includes a user operable selection switch to enable said master timer to control said electric output of said plurality of receptacles.

15. A resistance heating system according to claim 9, wherein said master timer includes an input arrangement for a user to input a selected time into said timer.

16. A resistance heating system comprising:
    a controller configured to be connected to a source of alternating current electricity and having a plurality of cable plug receptacles,
    a plurality of electricity conducting cables each having a cable plug at one end configured to be received in said receptacles and having a resistance heater provided at an opposite end,
    a timer associated with each receptacle,
    an input arrangement for a user to input a selected time into said timers, and
    a visual indicator arranged to display a status of each of said receptacles.

17. A resistance heating system according to claim 16, wherein said controller is mounted on a portable frame.

18. A resistance heating system according to claim 16, further including a remote controller arranged to provide timer control for each of said receptacles simultaneously.

19. A resistance heating system according to claim 16, wherein said source of alternating current electricity comprises 480 volt, 3 phase alternating current electricity.

20. A resistance heating system according to claim 16, wherein said resistance heater comprises a bolt heater.

21. A resistance heating system according to claim 20, wherein said bolt heater includes a visual indicator to indicate when electrical current is being supplied to said bolt heater.

22. A resistance heating system according to claim 20, further including an adapter sheath arranged to effectively increase a diameter of said bolt heater.

23. A multiple receptacle controller comprising:
    a portable frame configured to be connected to a source of alternating current electricity and having a plurality of cable plug receptacles arranged to receive electricity from said source,
    an individual timer associated with each receptacle and arranged to selectively control an electric output of the associated receptacle, including an input arrangement for a user to input a selected time into said individual timer,
    a master timer arranged to selectively control an electric output of a plurality of said receptacles, including an input arrangement for a user to input a selected time into said master timer,
    said input arrangement for said master timer being located on a pendant separate and remote from said portable frame of said controller, said pendant being connected to said controller frame via an electricity conducting cable, a switch associated with each receptacle to permit a user to select a master timer control or an individual timer control for each receptacle.

24. A multiple receptacle controller according to claim 23, wherein said frame is wheeled.

25. A multiple receptacle controller according to claim 23, wherein said switch further permits a user to energize each associated receptacle regardless of the status of any timer associated with said receptacle.

26. A multiple receptacle controller according to claim 23, further including a timing circuit to measure a period of time following the termination of energization of the receptacle by the selected timer and an illumination display energized following the termination of said period of time.

* * * * *